United States Patent [19]

Tohata

[11] 4,420,797  
[45] Dec. 13, 1983

[54] REAR LAMP CONSTRUCTION OF A HATCHBACK TYPE MOTOR VEHICLE

[75] Inventor: Toru Tohata, Yokohama, Japan

[73] Assignee: Nissan Motor Co., Ltd., Yokohama, Japan

[21] Appl. No.: 319,056

[22] Filed: Nov. 6, 1981

[30] Foreign Application Priority Data

Dec. 9, 1980 [JP] Japan .......................... 55-177291[U]

[51] Int. Cl.³ ........................... B60Q 1/26; B60Q 1/44
[52] U.S. Cl. ..................................... 362/80; 362/82; 362/83; 362/234; 362/301; 362/346; 340/98
[58] Field of Search ................. 362/61, 80, 82, 83, 362/145, 147, 152, 153, 234, 249, 252, 268, 300, 301, 307, 311, 341, 346, 31, 74, 140, 253, 310, 351; 296/1 C, 50, 56, 76, 146; 340/91, 98, 99; 116/28 R, 35 R, 51

[56] References Cited

U.S. PATENT DOCUMENTS

| 852,505 | 5/1907 | Gunn | 362/80 X |
|---|---|---|---|
| 1,363,583 | 12/1920 | Gallaher | 362/80 |
| 1,519,345 | 12/1924 | Allen | 362/301 X |
| 1,540,225 | 6/1925 | Ryan | 362/80 X |
| 1,671,438 | 5/1928 | Moen | 362/301 |
| 1,810,216 | 6/1931 | Kurtz | 362/268 X |
| 1,837,091 | 12/1931 | Adams | 362/301 |
| 1,954,010 | 4/1934 | Koubek | 362/80 X |
| 2,183,462 | 12/1939 | Mestre | 362/140 X |
| 2,996,210 | 8/1961 | Thomas | 296/76 X |
| 4,183,575 | 1/1980 | Hayashi | 296/56 |

FOREIGN PATENT DOCUMENTS

| 1555588 | 11/1970 | Fed. Rep. of Germany | 296/76 |
|---|---|---|---|
| 3005883 | 10/1981 | Fed. Rep. of Germany | |
| 2466703 | 4/1981 | France | |
| 2470709 | 6/1981 | France | |

Primary Examiner—David H. Brown  
Assistant Examiner—John E. Griffiths, Jr  
Attorney, Agent, or Firm—Lane, Aitken & Kananen

[57] ABSTRACT

In a hatchback type motor vehicle having a hatchback door which is swingable relative to the vehicle body to open and close a door opening defined in the rear panel construction of the vehicle, there is proposed a rear lamp construction which comprises a first device mounted in the rear panel construction for producing light which is directed toward the door opening, and a second device mounted in the hatchback door for, when the door is in its closed position, reflecting the light coming from the first device toward the back of the vehicle.

10 Claims, 5 Drawing Figures

U.S. Patent Dec. 13, 1983 Sheet 1 of 2 4,420,797
FIG.1
PRIOR ART
FIG.2
PRIOR ART
FIG.3
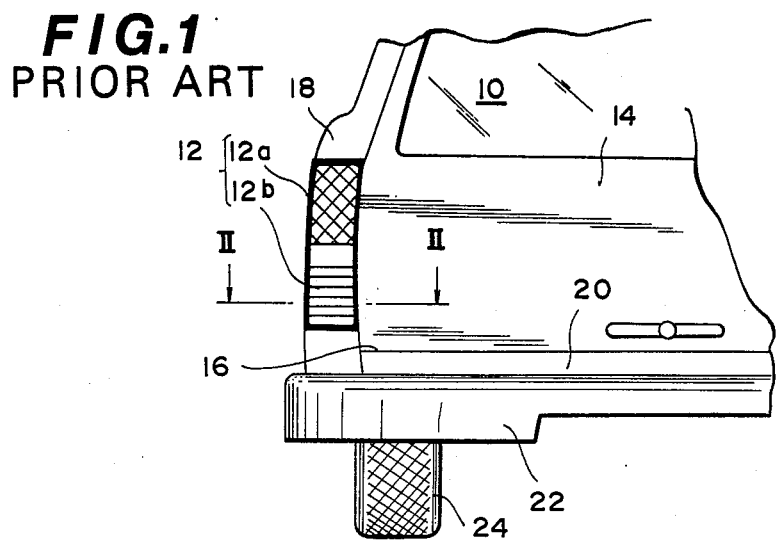
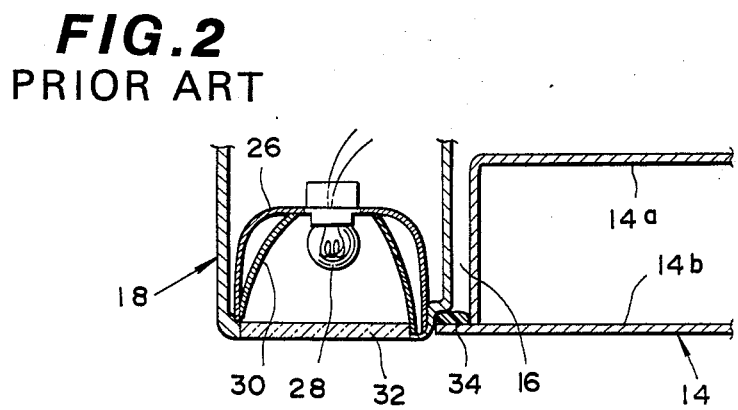
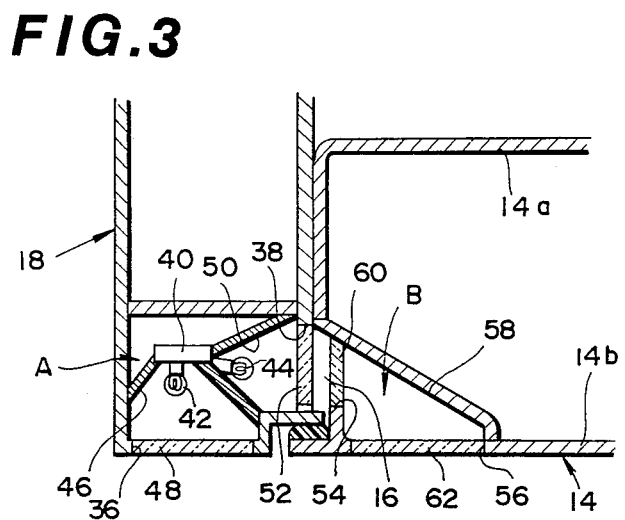

REAR LAMP CONSTRUCTION OF A HATCHBACK TYPE MOTOR VEHICLE

BACKGROUND OF THE INVENTION

The present invention relates in general to a rear lamp construction of a wheeled motor vehicle, and more particularly to a rear lamp construction of a hatchback type motor vehicle.

SUMMARY OF THE INVENTION

It is an object of the present invention to provide a rear lamp construction, for a hatchback type motor vehicle, which offers sufficient illumination areas to improve the recognition of the illumination on the back portion of the vehicle.

According to the present invention, there is provided a rear lamp construction of a motor vehicle of a type having a hatchback door which is swingable relative to the vehicle body to open and close a door opening defined in a rear panel construction of the vehicle. The rear lamp construction comprises first means mounted in the rear panel construction for producing light which is directed toward the door opening; and second means mounted in the hatchback door at a portion where the light coming from the first means reaches when the door is in its closed position, the second means reflecting the light coming from the first means toward the back of the vehicle.

BRIEF DESCRIPTION OF THE DRAWINGS

Other objects and advantages of the present invention will become clear from the following description when taken in conjunction with the accompanying drawings, in which:

FIG. 1 is a partial rear view of a hatchback type motor vehicle which is equipped with a conventional rear lamp construction;

FIG. 2 is a sectional, but enlarged, view taken along the line II—II of FIG. 1;

FIG. 3 is a view similar to FIG. 2, but showing a first embodiment of the present invention;

DESCRIPTION OF THE INVENTION

Figure 4:
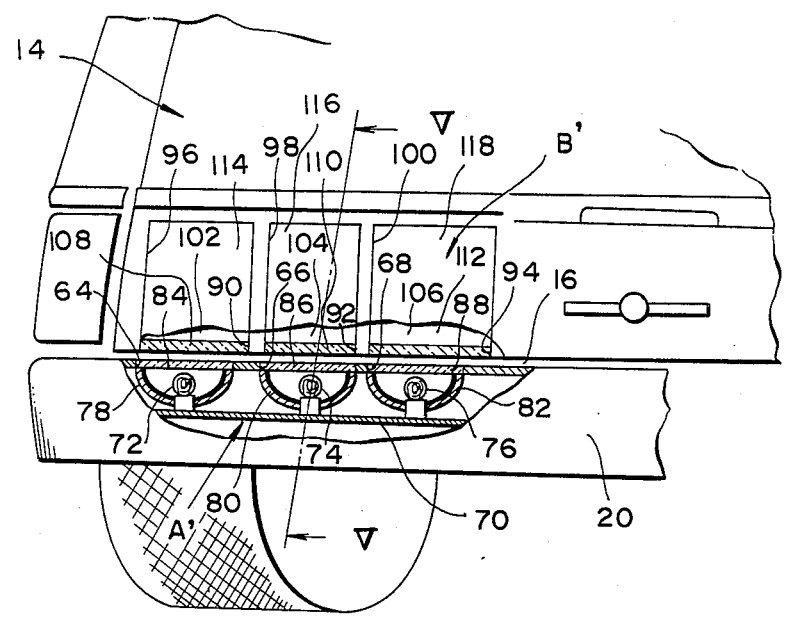
FIG. 4 is a partially broken rear view of a hatchback type motor vehicle to which a second embodiment of the present invention is applied.

Prior to describing the invention, one of the conventional rear lamp constructions of a hatchback type motor vehicle will be explained with reference to FIGS. 1 and 2 in order to clarify the invention.

In these drawings, particularly in FIG. 1, there is shown a hatchback type wheeled motor vehicle 10 to which a conventional rear lamp construction 12 is mounted. The motor vehicle 10 has a hatchback door 14 which is hinged at its upper portion to the vehicle body so as to be upwardly and downwardly swingable about the hinged portion to open and close a door opening 16 which is defined by rear side bodies 18 (only one being shown), a roof panel (not shown) and a rear transverse lower panel 20. Designated by numerals 22 and 24 are a rear bumper and a rear-left road wheel of the vehicle 10.

The rear lamp construction 12 hereinshown is a combination lamp unit consisting of a stop lamp 12a and a tail lamp 12b. The lamp unit 12 is mounted on the back portion of each rear side body 18 and comprises, as is understood from FIG. 2, a supporter 26 tightly received in the rear side body 18, electric bulbs 28 (only one being shown) held on the supporter 26, frusto-conical light reflecting mirrors 30 coaxially disposed about the respective bulbs 28, and a light transmitting cover 32 or a lens covering the larger open ends of the mirrors 30. The hatchback door 14 is comprised of an inner panel 14a and an outer panel 14b. Designated by numeral 34 is an elastic packing which is bonded to the peripheral portion of the door 14 to assure sealing between the door 14 and the vehicle body 10 upon closing of the door 14.

However, in the conventional rear lamp construction of the type mentioned above, there is a limit to increasing the size of the combination lamp unit or the area of the light transmitting cover 32 because of the inherent narrowness of the place, viz. the back portion of the rear side body 18, where the lamp unit 12 is to be mounted. Thus, a sufficient recognition effect can not be expected from such construction especially on a cloudy or rainy day.

Hitherto, a measure has been proposed for eliminating such drawback, in which a lamp unit is mounted on the hatchback door. Although, in this case, enlargement of the unit or increase in illumination area can be easily made, there is a necessity of a quite troublesome electric wiring owing to the pivotal arrangement of the door to the vehicle body.

To eliminate the above-mentioned drawbacks is an essential object of the present invention. In the following, the present invention will be described in detail.

Referring to FIG. 3, there is shown a first embodiment of the present invention. In this drawing, the same parts as those in FIG. 2 are designated by the same numerals.

The rear lamp construction of the first embodiment comprises generally a first illumination device A mounted on the rear side body 18 and a second illumination device B mounted on the hatchback door 14. As will become apparent as the description proceeds, the second illumination device B has no electric bulbs therein and functions only to reflect the light, which comes thereto from the first illumination device A, toward the back of the vehicle.

The first illumination device A is mounted on the back portion of the rear side body 18. For this mounting, the back portion of the body 18 is formed with both an opening 36 facing backward of the vehicle and another opening 38 facing toward the door opening 16. The device A comprises a lamp holder 40 tightly held in the body 18. Two spaced electric bulbs 42 and 44 are mounted on the lamp holder 40 and have respective electric lead wires (not shown) extending therefrom and lying in the body 18. A frusto-conical light reflecting mirror 46 is coaxially disposed about the bulb 42 with its larger open end facing the opening 36. A light transmitting cover 48 or a lens is mounted in the opening 36 so as to cover the larger open end of the mirror 46. Another frusto-conical light reflecting mirror 50 is coaxially disposed about the other electric bulb 44 with its larger open end facing toward the door opening 16. A light transmitting cover 52 is mounted in the opening 38 so as to cover the larger open end of the mirror 50. With this arrangement, it will be appreciated that the light emitted from the bulb 42 is directed toward the back of the vehicle through the light transmitting cover 48, while, the light from the bulb 44 is directed toward the door opening 16 through the light transmitting cover 52.

The second illumination device B is mounted on the hatchback door 14 at the portion where the light from the bulb 44 reaches when the door 14 is in its closed position. For facilitation of explanation, the following description will be made with respect to a condition wherein the door 14 is in its closed position, that is, in the position as shown in FIG. 3. For mounting thereon the second illumination device B, the door 14 is formed with both an opening 54 facing the light transmitting cover 52 of the first illumination device A, and another opening 56 facing backward of the vehicle. The second illumination device B comprises a flat light reflecting mirror 58 which is received in the receptacle portion of the door 14 and secured to the door panels 14a and 14b in a manner to be inclined with respect to the advancing direction of the light from the bulb 44. Preferably, the mirror 58 is inclined at 45 degrees with respect to the light advancing direction. A light transmitting cover 60 is mounted in the opening 54, and another light transmitting cover 62 or a lens is mounted in the opening 56 of the door 14, as shown. With this arrangement, it will be appreciated that the light from the electric bulb 44 of the first illumination device A enters the second illumination device B and is reflected by the flat mirror 58 toward the cover 62, that is, toward the back of the vehicle.

Figure 5:
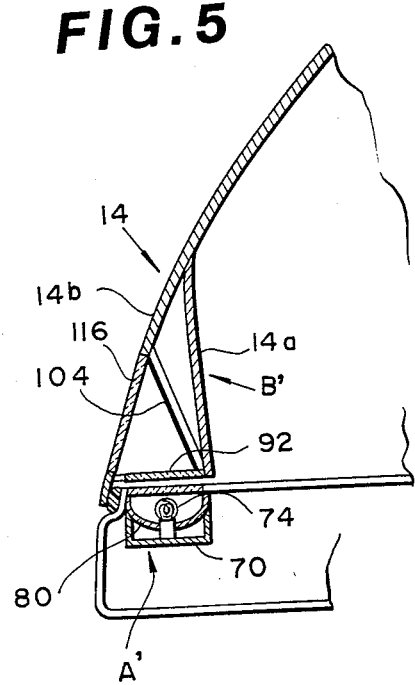
FIG. 5 is a sectional view taken along the line V—V of FIG. 4.

Referring to FIGS. 4 and 5, especially FIG. 4, there is shown a second embodiment of the present invention. As will become apparent as the description proceeds, the rear lamp construction of this second embodiment is designed to illuminate only the illumination device mounted on the hatchback door 14.

The rear lamp construction of the second embodiment comprises generally a lamp mounting device A' mounted on the rear transverse lower panel 20, and an illumination device B' mounted on the hatchback door 14.

For mounting thereon the lamp mounting device A', the panel 20 is formed with aligned openings 64, 66 and 68 all of which face upwardly, that is, toward the door opening 16. The device A' comprises a lamp holder 70 tightly held in the panel 20. Three spaced electric bulbs 72, 74 and 76 are held by the lamp holder 70 and have respective electric lead wires (not shown) extending therefrom and lying in the panel 20. Frusto-conical light reflecting mirrors 78, 80 and 82 are coaxially disposed about the bulbs 72, 74 and 76, respectively, with their larger open ends facing the corresponding openings 64, 66 and 68. Light transmitting covers 84, 86 and 88 are respectively mounted in the openings 64, 66 and 68 so as to cover the larger open ends of the mirrors 78, 80 and 82. With this arrangement, it will be appreciated that the light emitted from each of the bulbs 72, 74 and 76 is directed upward, that is, toward the door opening 16 of the vehicle.

The illumination device B' is mounted on the hatchback door 14 at the portion where the light from the bulbs 72, 74 and 76 reaches when the door 14 is in its closed position. Similar to the first embodiment, the following description will be made with respect to a condition wherein the door 14 is in its closed position, that is, in the position as shown in the drawings (FIGS. 4 and 5). For mounting thereon the illumination device B', the door 14 is formed with a first group of openings 90, 92 and 94 which face the light transmitting covers 84, 86 and 88 of the lamp mounting device A' respectively, and a second group of openings 96, 98 and 100 which face backward of the vehicle. If desired, some of the openings 96, 98 and 100, for example, the openings 98 and 100, may be united to provide a larger opening in the rear transverse lower panel 20. The illumination device B' comprises flat light reflecting mirrors 102, 104 and 106 each of which is secured to the panels 14a and 14b of the door 14 in a manner to be inclined with respect to the advancing direction of the light from the corresponding bulb 72, 74 or 76. Light transmitting covers 108, 110 and 112 are mounted in the first group of openings 90, 92 and 94 respectively, and light transmitting covers 114, 116 and 118 are mounted respectively in the second group of openings 96, 98 and 100. With this arrangement, it will be appreciated that the light emitted from the bulbs 72, 74 and 76 of the light mounting device A' enter the illumination device B' and is reflected by the corresponding flat mirrors 102, 104 and 106 toward the exteriorly exposed light transmitting covers 114, 116 and 118, that is, toward the back of the vehicle.

From the above description, it will be appreciated that when the hatchback door 14 is in its closed position under energization of the electric bulbs, a considerable area of the hatchback door 14 participates in offering effective recognition of the rear of the vehicle. In short, the rear lamp construction according to the present invention can provide a larger illumination area on the rear portion of the vehicle because of using the hatchback door as a promoting means for the illumination. When the hatchback door 14 is in its open position, the light from each bulb will come through the first illumination device A (in the first embodiment) or the lamp mounting device A' (in the second embodiment). However, this light is usable for lighting up the surrounding of the rear of the vehicle.

It is also to be noted that because the illumination device on the hatchback door 14 has no electric bulbs, the troublesome wiring on the door is not necessitated in the present invention. This is quite advantageous in production of the vehicle.

I claim:

1. A rear lamp construction of a motor vehicle of a type having a hatchback door which is swingable relative to the vehicle body to open and close a door opening defined in a rear panel construction of the vehicle, said rear lamp construction comprising:
   a first device mounted in said rear panel construction and including a first electric bulb which, when energized, produces light which is directed toward the door opening; and
   a second device mounted in said hatchback door at a portion where the light coming from said first device reaches when the door is in its closed position, said second device including a first light reflecting mirror for reflecting rearward of the vehicle the light coming from said first device.

2. A rear lamp construction as claimed in claim 1, in which said first device includes a second light reflecting mirror for enforcedly directing the light coming from the first electric bulb toward the door opening.

3. A rear lamp construction as claimed in claim 2, in which said first device further comprises a first light transmitting member mounted in an opening which is formed in said rear panel construction at a position to face the door opening, so that the light coming from said first electric bulb transmits through the first light transmitting member during its travelling toward the second device.

4. A rear lamp construction as claimed in claim 3, in which said second device further comprises second and third light transmitting members, said second light transmitting member being mounted in an opening which is formed in said hatchback door at the portion which faces said first light transmitting member of said first device when the door is in its closed position, said third light transmitting member being mounted in an opening which is formed in said hatchback door at a position to face backward of the vehicle, whereby the light coming through the first light transmitting member of said first device transmits through the second light transmitting member, then reflects on the first light reflecting mirror of said second device and then transmits through said third light transmitting member.

5. A rear lamp construction as claimed in claim 4, in which said second light reflecting mirror is a frusto-conical mirror which is coaxially disposed about the electric bulb with its larger open end facing toward the door opening, and in which said first light reflecting mirror is a flat mirror which is secured to said door in a manner to be inclined with respect to the advancing direction of the light coming from said first electric bulb.

6. A rear lamp construction as claimed in claim 4, in which said third light transmitting member is a lens.

7. A rear lamp construction as claimed in claim 4, in which said first device further comprises a second electric bulb for producing light when energized, and a third light reflecting mirror for enforcedly directing the light coming from said second electric bulb rearward of the vehicle.

8. A rear lamp construction as claimed in claim 7, in which said third light reflecting mirror is a frusto-conical mirror which is coaxially disposed about said second electric bulb with its larger open end facing backward of said vehicle.

9. A rear lamp construction as claimed in claim 7, in which said first device further comprises a fourth light transmitting member, said fourth light transmitting member being mounted in an opening which is formed in said rear panel construction at a position to face backward of the vehicle, whereby the light coming from the second electric bulb transmits through the fourth light transmitting member during its travelling rearward of the vehicle.

10. A rear lamp construction as claimed in claim 9, in which said fourth light transmitting member is a lens.

* * * * *